US006614932B1

(12) United States Patent
Iwane

(10) Patent No.: US 6,614,932 B1
(45) Date of Patent: Sep. 2, 2003

(54) INFORMATION CONVERTING SYSTEM

(75) Inventor: Waro Iwane, Hokkaido (JP)

(73) Assignee: Iwane Laboratories Ltd., Hokkaido (JP)

( * ) Notice: Subject to any disclaimer, the term of this patent is extended or adjusted under 35 U.S.C. 154(b) by 0 days.

(21) Appl. No.: 09/460,758

(22) Filed: Dec. 14, 1999

(30) Foreign Application Priority Data

Apr. 5, 1999 (JP) ............................................ 11-097562

(51) Int. Cl.[7] ................................................. G06K 9/68
(52) U.S. Cl. ...................... 382/218; 382/199; 382/201; 382/232; 382/253; 382/305
(58) Field of Search ...................... 382/218, 232–240, 382/253, 199, 201, 203, 266, 305

(56) References Cited

U.S. PATENT DOCUMENTS

| 5,142,662 | A |   | 8/1992 | Gump et al. | |
|---|---|---|---|---|---|
| 5,479,537 | A |   | 12/1995 | Hamashima et al. | |
| 5,982,441 | A | * | 11/1999 | Hurd et al. | 348/417 |
| 6,035,322 | A | * | 3/2000 | Demura et al. | 709/201 |
| 6,128,023 | A | * | 10/2000 | Kawashima | 345/433 |
| 6,215,907 | B1 | * | 4/2001 | Kumar et al. | 382/240 |
| 6,256,045 | B1 | * | 7/2001 | Bae et al. | 345/455 |
| 6,304,601 | B1 | * | 10/2001 | Davison | 375/240 |
| 6,331,898 | B1 | * | 12/2001 | Yokoi et al. | 358/1.9 |
| 6,404,930 | B2 | * | 6/2002 | Inuzuka et al. | 382/235 |
| 6,408,095 | B1 | * | 6/2002 | Maeda et al. | 382/232 |

FOREIGN PATENT DOCUMENTS

| JP | 5-316491 | 11/1993 |
|---|---|---|
| JP | 08194712 | 7/1996 |
| JP | 09130259 | 5/1997 |
| WO | WO 95/26534 | 10/1995 |

OTHER PUBLICATIONS

Huang et al. "Efficient shape matching through model–based shape recognition". *Pattern Recognition*, vol. 29, No. 2, pp. 207–215 (Feb. 1996).
Dezhong et al. "A prototype indexing approach to 2–D object description and recognition". *Pattern Reognition*, vol. 31, No. 6, pp. 699–725 (Jun. 1998).

* cited by examiner

*Primary Examiner*—Timothy M. Johnson
*Assistant Examiner*—Gregory Desire
(74) *Attorney, Agent, or Firm*—Merchant & Gould P.C.

(57) ABSTRACT

An information code converting apparatus converts object information acquired with respect to an object into a registered information code in association with the object, and transmits or outputs the information code in combination with a configuration code. A reproduced information converting apparatus converts the information code transmitted or inputted from the information code converting apparatus into registered reproduced object information in association with the information code, configuring and reproducing an image of the object. The information code converting apparatus has a parts warehouse database storing object data generated in association various objects, and the reproduced information converting apparatus has a reproduced parts warehouse database storing object data generated in association with the various objects. A parts retrieval correlation function calculating unit of the information code converting apparatus converts object information into an information code, and a parts configuration processing of the reproduced information converting apparatus converts the information code and the configuration code into reproduced object information to reproduce an image of the object.

5 Claims, 7 Drawing Sheets

FIG. 3

EXAMPLE A OF STORED DATA IN PARTS WAREHOUSE DATABASE

| ID (Key) | NAME | SHAPE (NUMERICAL DATA) | COLOR (NUMERICAL DATA) | ○ | △ |
|---|---|---|---|---|---|
| 1001 | UTILITY POLE | 25694458 | 2685696 | ------ | ------ |
| 1002 | PEDESTRIAN CROSSING | 25555655 | 26555565 | ------ | ------ |
| 1003 | HUMAN BEING | 52265566 | 4554485 | ------ | ------ |

FIG. 4

EXAMPLE A' OF STORED DATA IN REPRODUCED PARTS WAREHOUSE DATABASE

| ID (Key) | NAME | SHAPE (NUMERICAL DATA) | COLOR (NUMERICAL DATA) | A | B |
|---|---|---|---|---|---|
| 1001 | UTILITY POLE | 25694458 | 2685696 | ---- | ---- |
| 1002 | PEDESTRIAN CROSSING | 25555655 | 2655565 | ---- | ---- |
| 1003 | HUMAN BEING | 52265566 | 45544485 | ---- | ---- |

FIG. 5

EXAMPLE B OF STORED DATA IN COORDINATE CODE DATABASE

| ID (Key) | COORDINATE-X | COORDINATE-Y | COORDINATE-Z | DIRECTION-X | DIRECTION-Y | DIRECTION-Z |
|---|---|---|---|---|---|---|
| 1001 | 12.236 | 15.469 | 58.221 | 0.365 | 0.265 | 0.681 |
| 1002 | 58.269 | 23.659 | 96.586 | 0.698 | 0.365 | 0.689 |
| 1003 | 89.365 | 98.123 | 73.951 | 0.165 | 0.985 | 0.852 |

FIG. 7

EXAMPLE C OF STORED DATA OF DANGEROUSNESS IN PARTS WAREHOUSE DATABASE

| ID (Key) | NAME | SHAPE (NUMERICAL DATA) | COLOR (NUMERICAL DATA) | DANGER TYPE | φ |
|---|---|---|---|---|---|
| 1001 | UTILITY POLE | 25694458 | 2685696 | 1 | ------- |
| 1002 | PEDESTRIAN CROSSING | 25555655 | 2655565 | 0 | ------- |
| 1003 | HUMAN BEING | 52265566 | 4554485 | 3 | ------- |

INFORMATION CONVERTING SYSTEM

BACKGROUND OF THE INVENTION

1. Field of the Invention

The present invention relates to an information converting system in which a sender and a receiver share common information codes, the sender generates and sends an information code corresponding to the information of an object that the sender has acquired, and the receiver converts the received information code into the corresponding information of an object, so that desired information, e.g., image information, can be transmitted, received, and recorded simply and quickly using information codes that can be transmitted as a relatively small amount of information.

2. Description of the Related Art

Information of various images including still images and moving images may be transmitted to a remote location as a number of pixels that are generated by dividing the image information. Since, however, the amount of image information transmitted as such pixels is very large, there has been developed an image compression technology which allows a sender to compress the data of the pixels and transmit the compressed data as a reduced amount of information, and which also allows a receiver to restore the original image from the compressed data. Various processes of the image compression technology have been proposed in the art. For example, JPEG (Joint Photographic Coding Experts Group) has generally been employed as an international standard process for compressing and encoding still image information, and MPEG (Motion Picture Coding Experts Group) has generally been employed as an international standard process for compressing and encoding moving image information.

Since these compressing and encoding processes primarily operate by appropriately decimating a number of pixels from desired image information according to certain rules or processing only moving image information in frames to reduce the overall quantity of image information, they basically process the image information itself. Therefore, though these processes attempt to simplify images themselves, the processed images still contain a large amount of image information. As a consequence, the conventional compressing and encoding processes suffer problems in that the rate of processing compressed image information, e.g., storing and transmitting compressed image information, is relatively low.

The inventor of the present invention has made various research efforts to solve the above problems of the conventional processes, and found that various information of objects which have been acquired should not be directly transmitted, recorded, reproduced, and stored by a sender and a receiver, but common information codes corresponding to objects, e.g., IDs or codes converted from attributes or the like of objects, should be shared by a sender and a receiver, the acquired information of an object should be converted into an ID or code corresponding thereto and the ID or code should be transmitted by the sender, and the corresponding reproduced information of an object should be converted from the received ID or code by the receiver, for thereby greatly reducing the amount of information that needs to be transmitted, recorded, reproduced, and stored.

SUMMARY OF THE INVENTION

It is an object of the present invention to provide an information converting system for reducing an amount of information to be transmitted and received to allow the information to be processed quickly at a high rate on a real-time basis for thereby making it possible to transmit information at a high rate, record highly compressed information, and communicate between different information spaces.

According to the principles of the present invention, a sender (recorder) and a receiver (reproducer) have a common storage of information codes in the form of IDs and codes converted from various information of objects as a parts warehouse database or a reproduced parts warehouse database, the sender transmits the acquired information of an object as an information code in the form of an ID and code, and the receiver converts the received information code into the reproduced information of an object corresponding thereto, so that the amount of information that is sent by the sender and received by the receiver can greatly be reduced.

To achieve the above object, there is provided in accordance with the present invention an information converting system comprising an information code converting apparatus for converting object information acquired with respect to an object into a registered information code in association with the object, and transmitting or outputting the information, and a reproduced information converting apparatus for converting the information code transmitted or inputted from the information code converting apparatus into registered reproduced object information in association with the information code.

The information code converting apparatus may comprise parts retrieval correlation function calculating means for comparing object data generated and stored in a parts warehouse database in association with objects, with the acquired object information, and selecting corresponding object data to generate the information code corresponding to the object information.

More specifically, the information code converting apparatus may comprise field analysis correlation function calculating means for analyzing positions of objects in acquired images based on a field information database, optimum coordinate generating means for analyzing calculated results of the field analysis correlation function calculating means based on a coordinate code database thereby to generate optimum coordinates in the images, preprocessing means for defining contours of objects in the images from an analysis in the acquired images, and parts retrieval correlation function calculating means for converting contour data produced by the preprocessing means, field data produced by the field analysis correlation function calculating means, and optimum coordinate data produced by the optimum coordinate generating means into configuration codes, and comparing the object data in a parts warehouse database with the acquired object information, and selecting corresponding object data thereby to generate information codes to be combined with the configuration codes.

The information code may comprise a combination of object data representing numerical values of the object and attributes thereof.

The reproduced information converting apparatus may comprise parts configuration processing means for converting the information code relative to the object converted by the information code converting apparatus into reproduced object information corresponding to the object based on reproduced object information which is registered and stored a reproduced parts warehouse database with respect to objects to be reproduced in association with the information code. The object information and the information code in the parts warehouse database may be associated with each other in substantially the same manner as the information code and the reproduced object information in the reproduced parts warehouse database are associated with each other.

The parts configuration processing means may comprise means for converting the information code into reproduced part image information corresponding to an image of the object information based on the reproduced parts warehouse database, and, in connection with the conversion of the information code into reproduced part image information, configuring a reproduced part image according to a configuration code representing coordinates and directions of the object and transmitted or outputted from the information code converting apparatus.

Information relative to an object which has been acquired at a sender or an outputting side is compared with object data in the parts warehouse database by the parts retrieval correlation function calculating means, and converted into a selected corresponding information code in the form of a numerical value, which is transmitted to a receiver or outputted.

At a receiver or an inputting side where the transmitted or outputted information code is received, the information code is compared with reproduced object dada in the reproduced parts warehouse database by the parts configuration processing means, and converted into reproduced object information which is selected as corresponding to the information code.

If the information code is related to an image, then it is transmitted or outputted together with a configuration code representing coordinates and directions generated on the basis of analysis and recognition of the position and contour of the object with the field analysis correlation function calculating means, the optimum coordinate generating means, and the preprocessing means. When the information code is received or inputted, the parts configuration processing means of the reproduced information converting apparatus converts the information code into a reproduced object image according to a configuration indicated by the configuration code.

If the object data stored in the parts warehouse database and the reproduced object data stored in the reproduced parts warehouse database are substantially the same as each other, then the converted reproduced object information is substantially identical to the original object information that has been acquired.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a diagram showing an example of stored data in a parts warehouse database in the information code converting apparatus;

FIG. 4 is a diagram showing an example of stored data in a reproduced parts warehouse database in the reproduced information converting apparatus;

FIG. 5 is a diagram showing an example of stored data in a coordinate code database in each of the information code converting apparatus and the reproduced information converting apparatus;

FIG. 7 is a diagram showing an example of stored danger data in the reproduced parts warehouse database in the reproduced information converting apparatus shown in FIG. 6.

DETAILED DESCRIPTION OF THE PREFERRED EMBODIMENT

Figure 1:
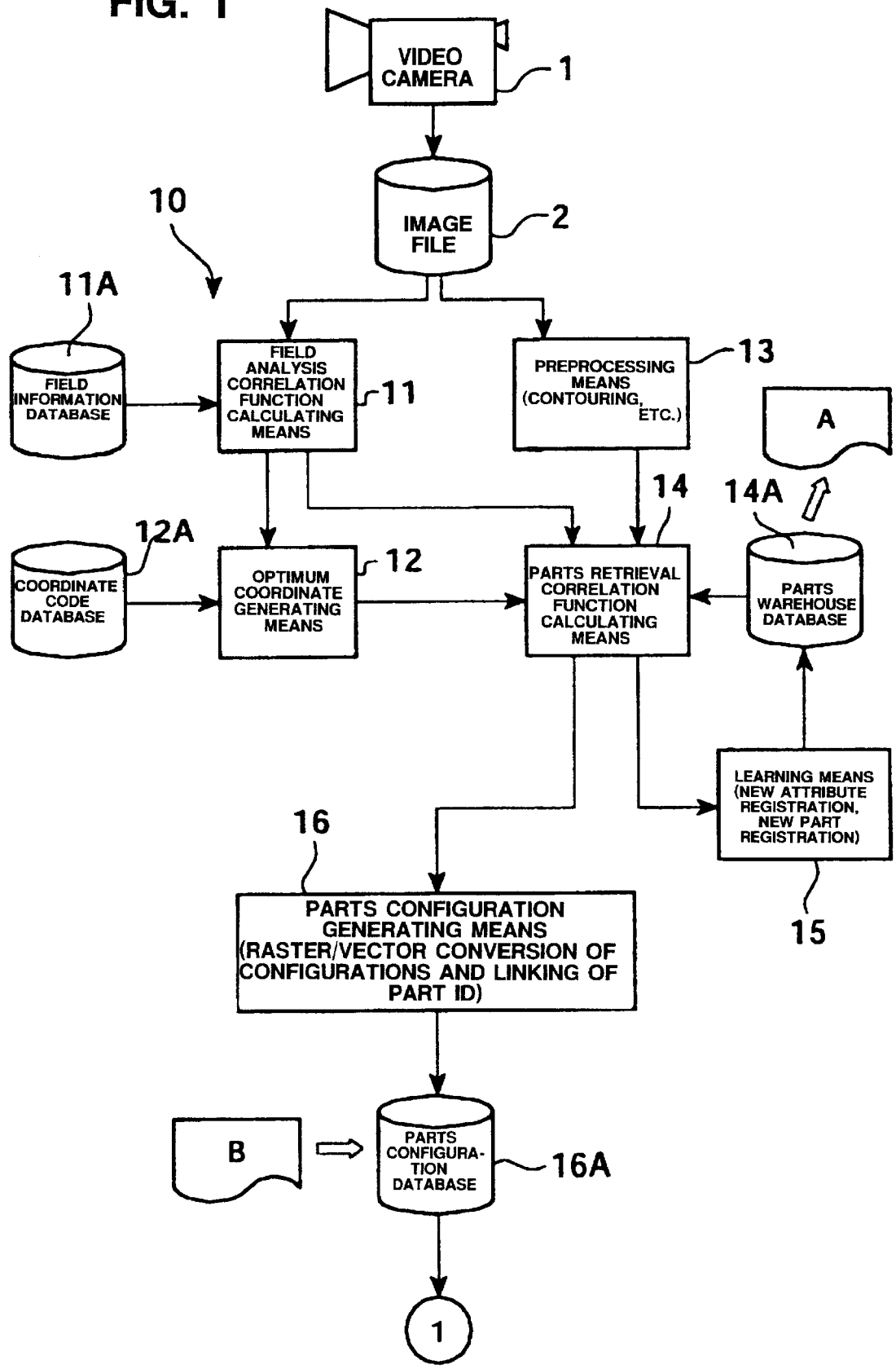
FIG. 1 is a block diagram of an information code converting apparatus of an information converting system according to the present invention.

As shown in FIG. 1, an information code converting apparatus of an information converting system according to the present invention includes a video (VTR) camera 1 for capturing an image of objects to acquire information of the objects, e.g., image information of the objects. The image information acquired by the video camera 1 is stored in an image file 2.

The video camera 1 acquires two-dimensional information as an image from an original information space which represents the objects. At this time, the video camera 1 converts a three-dimensional space into two-dimensional data according to a digital recording process. If the video camera 1 simultaneously acquires a plurality of images with parallax from objects, then the video camera 1 produces three-dimensional image information representing three-dimensional images of the objects. The video camera 1 can also acquire image information of moving images with motion parallax and still images with no motion parallax, and store the acquired image information in the image file 2.

Then, an information code converting apparatus 10 analyzes the image information thus stored as object information in the image file 2. Thereafter, depending on the types, number, positions, directions, etc. of the analyzed object information, the information code converting apparatus 10 converts the object information into information codes in the form of IDs (Keys) and codes related to those types, number, positions, directions, etc. The information code converting apparatus 10 comprises a field analysis correlation function calculating means 11 for analyzing image information based on a field information database 11A, an optimum coordinate generating means 12 for analyzing calculated results of the field analysis correlation function calculating means 11 based on a coordinate code database 12A thereby to generate optimum coordinates in images, a preprocessing means 13 for defining contours of various objects in image information from an analysis of an acquired image and performing a contouring process on the objects, and a parts retrieval correlation function calculating means 14 for converting contour data produced by the preprocessing means 13, field data produced by the field analysis correlation function calculating means 11, and optimum coordinate data produced by the optimum coordinate generating means 12 into configuration codes, and comparing the configuration codes with object data (see an example A of stored data shown in FIG. 3) which are registered and stored in a parts warehouse database 14A in association with various recognized object information, and selecting object data thereby to generate information codes to be combined with the configuration codes.

The field information database 11A used by the field analysis correlation function calculating means 11 comprises a database of classified groups of objects. For example, when image information of objects acquired as images is analyzed for frequencies, the objects are recognized as vertically ranked objects, e.g., more complex objects having higher frequencies are recognized as lower or upper ranked objects or brighter objects are recognized as upper or lower ranked objects, and the objects are recognized as differently distanced objects, e.g., objects having higher frequencies are recognized as complex, far objects, in the field information database 11A. Furthermore, spaces such outdoor, indoor, aerial, ground, and underwater spaces are separated, and parts existing in these separated spaces are limited and stored in the field information database 11A, and times such as morning, noon, seasons, etc. are separated in the field information database 11A.

The preprocessing means 13 determines edges in order to recognize objects acquired as images to extract contours thereof. The preprocessing means 13 determines a coordinate system for allowing objects to be easily configured thereby to generate an effective three-dimensional mesh, and converts parts in the form of a mesh for comparison. For example, the preprocessing means 13 determines an orientational coordinate system of a part by detecting its horizontal and vertical planes, so that the part can acquire three-dimensional coordinates based on the determination of the orientational coordinate system, and determines transformation equations based on the fact that the orientational coordinate system can be transformed to and from an orthogonal coordinate system (three-dimensional still coordinate system) at all times.

According to a first process of generating a three-dimensional image, if a part can be identified, then the same part can be determined in a different acquired image, and a three-dimensional image of the part can be generated by aligning the part positions. According to a second process of generating a three-dimensional image, when a camera viewpoint is moved and rotated, the orientational coordinate system of a part varies following the camera viewpoint, resulting in an increase in the field of view of the image as viewed from above a reproduced configuration of parts, and the distance by which the camera viewpoint is moved and rotated can be calculated from the movement of the part and the deformation of the part, i.e., the deformation of the orientational coordinate system. Even if the camera position, movement, and rotation are not necessarily determined, the orientational coordinate system of a part can uniquely be determined from the deformation of the part provided the part is identified. Therefore, even different acquired images can be joined to each other by following the orientational coordinate system of a part. To this end, coordinate transformation equations for the orientational coordinate system in case the camera viewpoint is moved are determined.

In the parts retrieval correlation function calculating means 14, an object analyzed and recognized from an acquired image thereof by the field analysis correlation function calculating means 11, the optimum coordinate generating means 12, and the preprocessing means 13 is identified as a part image, and compared with various part data (see FIG. 3) stored as object data in the parts warehouse database 14A. If there is corresponding part data in the parts warehouse database 14A, then it is selected. If there is no corresponding part data in the parts warehouse database 14A, then similar part data is searched for. Specifically, as shown in FIG. 3, if an object is recognized as a "utility pole", then numerical data of its shape is stored as "25694458", numerical data of its color is stored as "2685696", various numerical data of other attributes of the object are related, and an information code as its ID or Key is identified as "1001", for example, in the parts warehouse database 14A. Similarly, if an object is recognized as a "pedestrian crossing", then its information code is identified as "1002", and if an object is recognized as a "human being", then its information code is identified as "1003". Other various recognized objects are associated and stored as information codes in the form of certain numerical values. Attributes such as shape, color, etc. of objects are stored as certain numerical data in the parts warehouse database 14A. The ID (Key) of an object whose image has been analyzed and recognized, and data relative to various attributes of the object are combined depending on results of the recognized image for thereby generating an information code. The object data in the parts warehouse database 14A are provided in association with information codes as belonging to the parts retrieval correlation function calculating means 14 of a sender. The association between the object data and the information codes is substantially similar to the association between reproduced object data and information codes in a reproduced parts warehouse database 24A belonging to a parts configuration processing means 24 of a receiver (described later on). For example, the object data and the reproduced object data are of substantially the same database structure if reproduced object information is converted and reproduced as being exactly identical to original object information.

The parts warehouse database 14A stores three-dimensional models of objects expected as various image information that is acquired by the video camera 1. Specifically, attributes of objects, e.g., physical properties including size, angle, curved surface, circle, and other shape details, color, material, weight, symmetry, surface reflectivity, luster, odor, sound spectrum, service life, dangerousness, preference, date of production, manufacturer, existing condition such as outdoor or indoor, and other attributes are stored in the parts warehouse database 14A. Furthermore, the relationship to another object, such as affinity for or exclusion of another part, the relationship to another object, such as properties for recognizing an object, priority ranking of properties for recognizing an object, other attributes, and the relationship to another object, and other properties are stored in the parts warehouse database 14A. A connected assembly of parts also exists as a part. For example, a part referred to as an automobile comprises a connected assembly of a body, tires, a steering wheel, an engine, etc. Therefore, a connected assembly of parts can be recognized as a part. Planets, the sun, the moon, and the ground as parts for determining time, a place, and a direction, and information relative to spatial layout such as outdoor, indoor, aerial, ground, and underwater may also be stored as parts data.

To the parts warehouse database 14A, there is connected a learning means 15 for learning object information whose information code is not available to the parts retrieval correlation function calculating means 14. The learning means 15 is capable of registering a new object as a new part and also registering new attributes of an object. If object information is not available in the database, then the learning means 15 converts the object information into an information code approximating the information code of a part whose existence is highly probable, and also learns such an information code.

The information code converting apparatus also has a parts configuration generating means 16 for analyzing coordinates of an object in an configuration in connection with the conversion of the acquired image of the object into an information code with the parts retrieval correlation function calculating means 14. The parts configuration generating means 16 effects raster and vector conversion of the configuration of the object and links it to a part ID in the parts warehouse database 14A. Specifically, the parts configuration generating means 16 converts coordinates and directions in images of information codes such as of "utility pole", "pedestrian crossing", "human being", etc., for example, converted by the parts retrieval correlation function calculating means 14, into IDs and keywords. For example, the parts configuration generating means 16 converts coordinates, i.e., positions along the axes of X, Y, Z, into a numerical value, e.g., "12.236", and converts directions, i.e., directions along the axes of X, Y, Z, into a numerical value, e.g., "0.365", and stores these numerical values as configuration codes (see an example B of stored data shown in FIG. 5) in a parts configuration database 16A.

For example, as shown in FIG. 5, the coordinates and directions of objects in analyzed and recognized images such as of "utility pole", "pedestrian crossing", "human being", etc., are analyzed and converted into numerical values, which are stored as configuration codes in the coordinate code database 12A Specifically, those configuration codes which represent coordinate-X, coordinate-Y, coordinate-Z, direction-X, direction-Y, direction-Z in relation to each of information codes established for respective objects are stored in the coordinate code database 12A.

In the information code converting apparatus 10, as described above, details of objects in images represented by image information acquired by the video camera 1 are analyzed and recognized, compared with object data in the parts warehouse database 14A, and converted into parts IDs. Configured situations of the objects are converted into configuration codes stored in the parts configuration database 16A, and stored in combination with information codes. When their capacity becomes extremely small, the stored data are recorded and transmitted.

Figure 2:
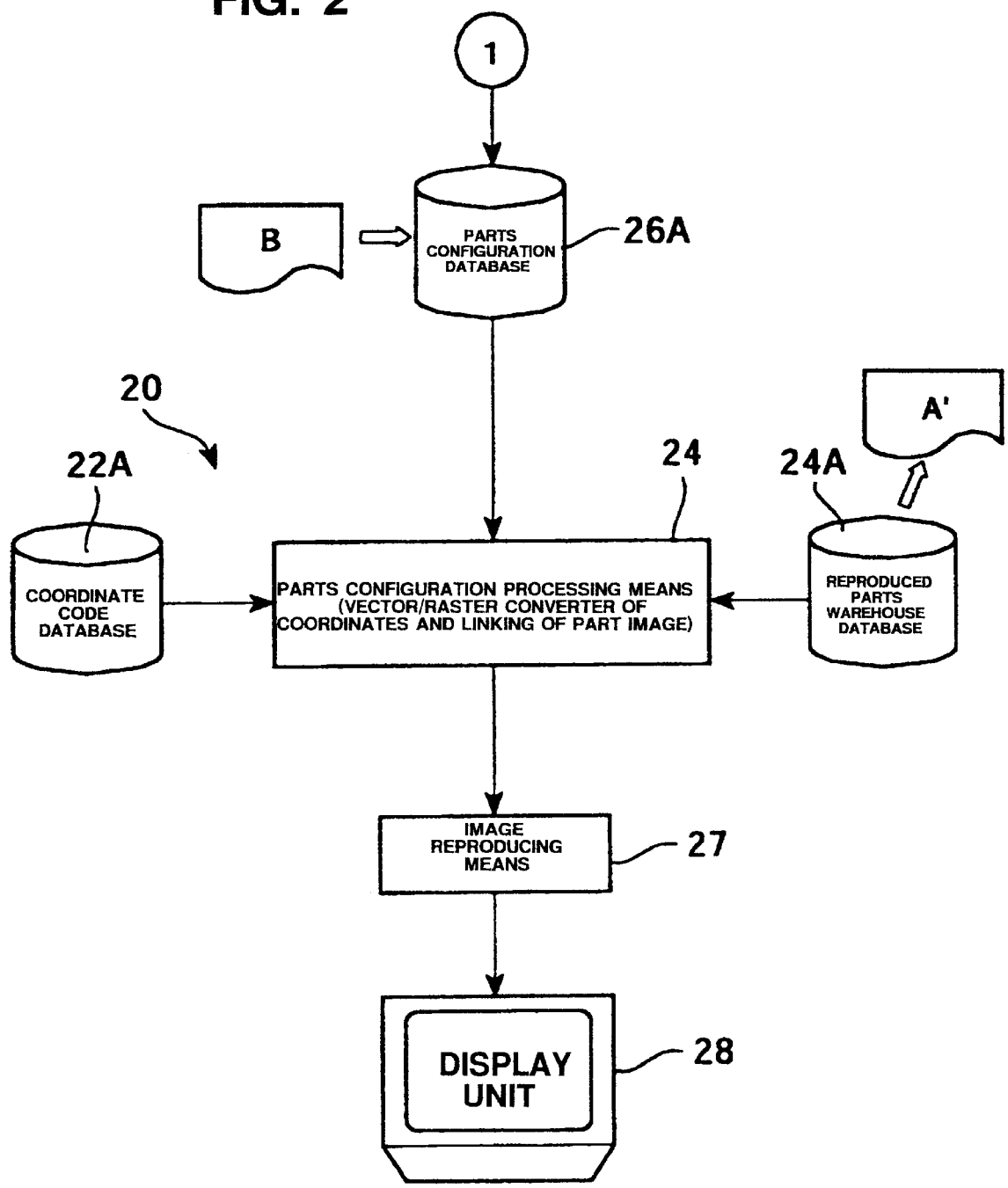
FIG. 2 is a block diagram of a reproduced information converting apparatus of the information converting system according to the present invention.
Figure 6:
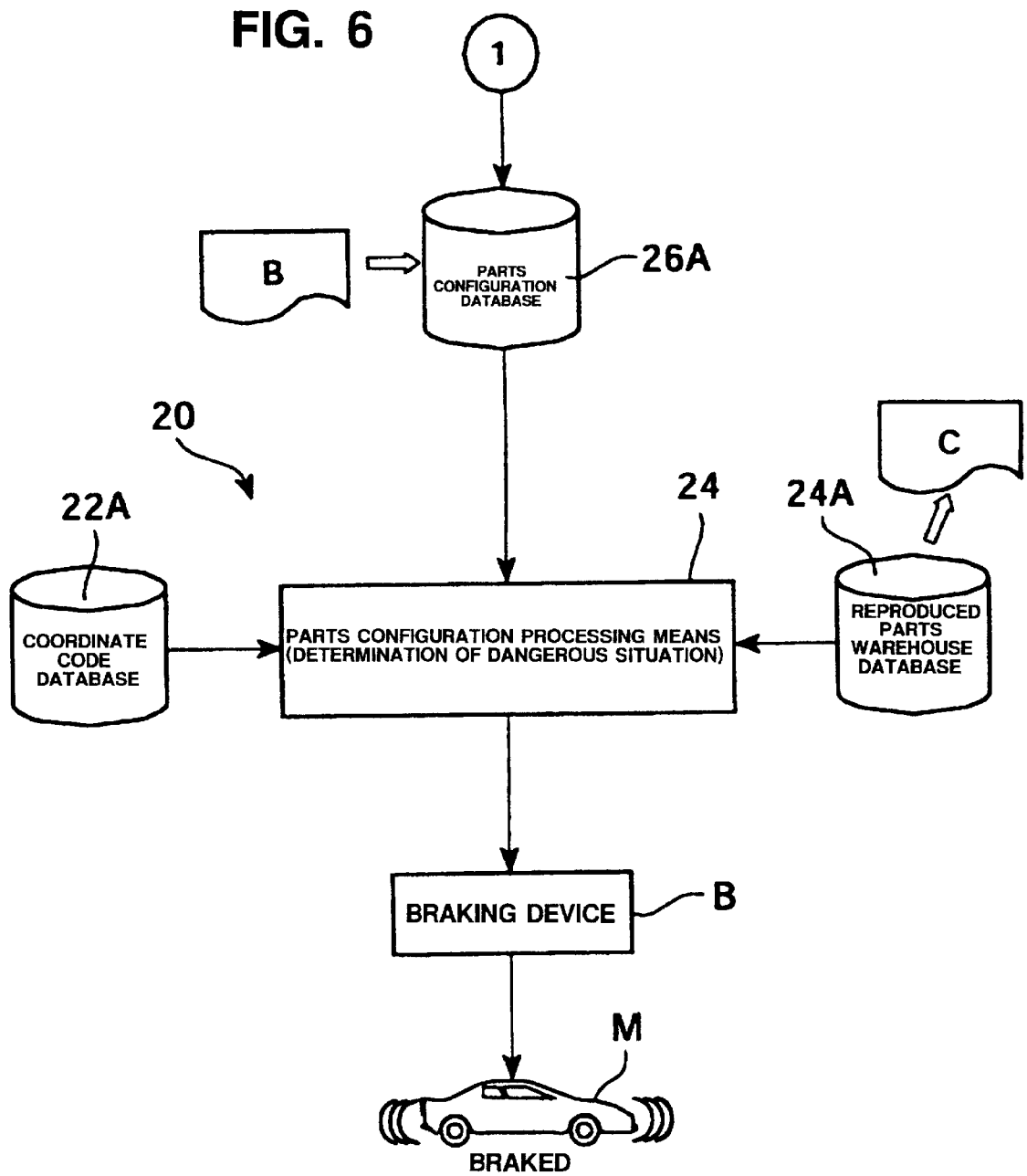
FIG. 6 is a block diagram of a specific example of the reproduced information converting apparatus as applied to a braking operation of an automatic automobile driving system.

When an information code relative to an image, for example, generated and converted into data by the sender is transmitted, a receiver which has received the information code converts the information code into a reproduced image with a reproduced information converting apparatus 20 which is arranged to perform a process that is a reversal of the process performed by the sender, as shown in FIG. 2. If object information to be reproduced is identical to the original object information, then the reproduced information convening apparatus 20 converts the information code relative to the original object information converted by the information code converting apparatus 10 into a reproduced part image of the object information with a reproduced parts warehouse database 24A (see an example A' of stored data shown in FIG. 4) which is substantially the same as the parts warehouse database 14A of the information code converting apparatus 10, and, in connection with the reproducing process, configures the reproduced part image according to a configuration code transmitted from the sender.

Specifically, the reproduced information converting apparatus 20 has a parts configuration generating means 24 for converting a transmitted information code relative to an image into a reproduced part image related thereto, and configuring the reproduced part image according to an configuration code (see FIG. 5), which is a keyword representing coordinates and directions, that has been transmitted while being linked with the original part image. The configured reproduced part image is displayed as a reproduced image on a display unit 28 such as a television monitor or the like by an image reproducing means 27.

The parts configuration generating means 24 converts an information code, which has been converted from details of an image of a part recognized by the parts retrieval correlation function calculating means 14 based on the object data in the parts warehouse database 14A, back into a reproduced part image corresponding to the original image details including attributes of the part such as shape, color, etc., based on a reproduced parts warehouse database 24A which is of substantially the same database structure as the parts warehouse database 14A. Specifically, the parts configuration generating means 24 reconstructs the original object image acquired by the video camera 1 based on the data in a coordinate code database 22A, vector and raster conversion of the coordinates of the reproduced part image, and linking of the reproduced part image.

The configuration code which represents conversion data for the configuration of the part is exactly the same as that in the parts configuration database 16A associated with the parts configuration generating means 16 (see FIGS. 2 and 5). According to the configuration code transmitted in relation to the information code, the parts configuration database 26A configures and reproduces the coordinates of the reproduced part image as positions along the respective axes of X, Y, Z and the directions thereof as directions along the axes of X, Y, Z.

In configuring reproduced parts, after a still coordinate system is determined, parts are successively applied in contact with dominant parts including the ground, surface of water, floor, wall, desk, etc. that have been registered as parts. When parts are applied, rotation and movement vectors of the parts are given, a direction, a field of view, and a movement vector which represent viewpoint information of the video camera 1 at the time of acquiring an object image are detected, and images can be three-dimensionally coupled by joining images. When reproduced parts are configured, related information as to when, where, who, whom, what, why, how, etc. can also be outputted, the relationship to other parts and existing conditions can be considered, their contradictions can be inspected, and comparing and selecting processes with other parts may be tried. Like the parts warehouse database 14A associated with the parts retrieval correlation function calculating means 14, it is possible to perform a learning process by registering, correcting, and deleting parts images and related parts, either forcibly or empirically.

In the information code converting apparatus 10, even if not all original object information can be converted into information code due to a shortage of object data in the parts warehouse database 14A, the image information of any unconverted object information, if it is in the form of images, may be transmitted as it is. Even in such a case, the amount of information that is transmitted is very small.

The information converting system according to the present invention as it is applied to an automobile driving system, for example, will be described below with reference to FIGS. 1, 3 through 6. The video camera 1 is mounted on an automobile M for monitoring its surroundings, particularly the direction of travel, e.g., the forward direction. If images captured by the video camera 1 contain a pedestrian crossing and objects in the images include the pedestrian crossing and a pedestrian thereon, then when the information code converting apparatus 10 analyzes the acquired images, the image of the pedestrian crossing is converted into an information code "1002" and the image of the pedestrian into an information code "1003" (see FIGS. 1 and 3). The converted information codes are outputted to the automobile driving system. When the information codes are converted back by the parts configuration processing means 24 having a dangerous situation decision function in the reproduced information converting apparatus 20 which has the reproduced parts warehouse database 24A (see an example C of stored data in FIG. 7) that stores stages of dangerousness, the pedestrian is recognized as existing on the pedestrian crossing. Because such a situation is established as being dangerous (see FIG. 7), the reproduced information converting apparatus 20 outputs a braking signal to actuate a braking device B to bring the automobile M to a stop.

The above process remains the same if the automobile driving system for the automobile M is automatized. Specifically, a converted information code is transmitted via a transmission means and received by a reception means in an automatic automobile driving system. The automatic automobile driving system determines the presence of a pedestrian on a pedestrian crossing as being dangerous, and issues a braking signal to actuate the braking device B to automatically stop an automobile C. It is possible to establish different stages of dangerousness depending on the details of information codes. For example, as shown in FIG. 7, the level of dangerousness for a utility pole is "1", the level of dangerousness for a human being is "3", and the level of dangerousness for a pedestrian crossing is "0".

In the above embodiment, an information code produced by analyzing and recognizing an acquired image is sent to a remote location, and then converted back to reproduce an image at a receiver or an input side of another device to which the information code is outputted. Information that is acquired with respect to an object is not limited to image information. Specifically, various object information that has been acquired can be transmitted as information codes to a destination and can be reproduced at the destination insofar as the object information can be converted to general physical quantities. For example, information relative to five senses, i.e., sight, hearing, smell, taste, and touch, or other information such as properties including quality, weight, surface reflectivity, etc. of various objects, and service life, dangerousness, preference, etc. thereof may be converted. The information converting system according to the present invention is not limited to being constructed as a transmitting and receiving system and an inputting and outputting system, but may be applicable to a system wherein a converted information code is recorded in a suitable recording medium such as a floppy disk or another magnetic recording disk, a laser disc (registered trademark) or another optical recording disk, a magnetic tape, or any of various recording mediums, and then reproduced and outputted by the reproduced information converting apparatus 20.

Reproduced object information to be converted by the reproduced information converting apparatus 20 is not limited to information corresponding to original object information. The information converting system may be constructed as a translation system for use between different information spaces, e.g., different languages, through the intermediary of information codes whose meanings remain substantially the same between the different languages.

The present invention offers the following advantages:

The parts warehouse database 14A and the reproduced parts warehouse database 24A which store object data and reproduced object data that correspond to information codes generated in relation to various information of objects are provided at both the sender and the receiver, or the inputting and outputting sides, or the recording and reproducing sides. It is possible to transmit an information code converted from acquired object information and convert the information code which has been received to reproduced object information to reproduce the object. As a consequence, the amount of information that needs to be transmitted and received can be highly reduced. Since the amount of information that needs to be transmitted and received is highly reduced, the information can be processed quickly on a real-time basis, making it possible to perform high-speed information transmission, highly compressed information recording, and communications between different information spaces.

Specifically, the information converting system according to the present invention has the information code converting apparatus 10 for converting object information into an information code registered in relation to an object represented by the object information, and transmitting or outputting the information code, and the reproduced information converting apparatus 20 for receiving or being supplied with the information code from the information code converting apparatus 10 and converting the information code back to reproduced object information corresponding to the object information. If the object information comprises information as to images, then the information converting system is required to process a much smaller amount of image information than the amount of image information that has been needed to be processed heretofore in the art, and hence can transmit image information at high speed, can record highly compressed image information, and can process image information on a real-time basis.

The parts retrieval correlation function calculating means 14 of the information code converting apparatus 10 compares acquired and recognized object information with object data generated, registered, and stored in the parts warehouse database 14A in association with various objects, and selects the corresponding object data to generate a corresponding information code. It is highly easy to convert the object information into an information code if the parts warehouse database 14A stores corresponding object data. Even if the parts warehouse database 14A stores no corresponding object data, the object information can easily be converted into an information code which approximates the corresponding object data. Since the converted information code is in the form of a numerical value, the amount of information carried by the information code is very small and hence can be handled very simply.

The parts configuration processing means 24 of the reproduced information converting apparatus 20 which is supplied with the transmitted information code reproduces the object information of the origin object based on the reproduced parts warehouse database 24A which registers and stores reproduced object data relative to object information to be reproduced in association with the information codes stored in the parts warehouse database 14A of the information code converting apparatus 10. Therefore, if the registered and stored data in the parts warehouse database 14A and the reproduced parts warehouse database 24A are common, then it is very easy for the reproduced information converting apparatus 20 to reproduce the object. Accordingly, the object, e.g., its image, can sufficiently be reproduced even if the amount of information transmitted is small.

The information code converting apparatus 10 has the field analysis correlation function calculating means 11 for analyzing the positions of various objects based on the field information database 11A, the optimum coordinate generating means 12 for analyzing calculated results of the field analysis correlation function calculating means 11 based on the coordinate code database 12A thereby to generate optimum coordinates in images, the preprocessing means 13 for defining contours of various objects in image information, and the parts retrieval correlation function calculating means 14 for generating information codes which are a combination of configuration codes generated on the basis of contour data, field data, and optimum coordinate data. Therefore, the information code converting apparatus 10 can transmit even configurations of the objects in acquired images. When a configuration code representing coordinates and directions is transmitted together with an information code, and reproduced by the parts configuration processing means 24, a reproduced object image is formed according to its configuration. Therefore, reproduced images are essentially the same as the acquired images.

The object data stored in the parts warehouse database 14A of the information code converting apparatus 10 and the reproduced object data stored in the reproduced parts warehouse database 24A of the reproduced information converting apparatus 20 are not limited to images, but may be anything that can be converted into general physical quantities. For example, attributes of objects may be converted into object data. The receiver or inputting side may reproduce and acquire various ancillary information from those object data.

Various information relative to objects, rather than image information, e.g., corresponding glossary information of different languages, e.g., in English and Japanese language spaces, may be stored in parts warehouse databases, with common information codes assigned to parts (words) having similar meanings. In this manner, it is possible to construct a simple translation system based on the principles of the present invention. The principles of the present invention are also applicable to any of various other fields.

Although a certain preferred embodiment of the present invention has been shown and described in detail, it should be understood that various changes and modifications may be made therein without departing from the scope of the appended claims.

What is claimed is:

1. An information converting system comprising:
   an information code converting apparatus for converting object information acquired with respect to an object into a registered information code in association with the object, and transmitting or outputting the information code, said information code converting apparatus including parts retrieval correlation function calculating means for comparing object data generated and stored in a parts warehouse database in association with objects, with the acquired object information, and selecting corresponding object data to generate the information code corresponding to the object information; and
   a reproduced information converting apparatus for converting the information code transmitted or inputted from said information code converting apparatus into registered reproduced object information in association with the information code said reproduced information converting apparatus including parts configuration processing means for converting the formation code relative to the object converted by said information code converting apparatus into reproduced object information corresponding to the object based on reproduced object information which is registered and stored in a reproduced pans warehouse database with respect to objects to be reproduced in association with the information code;
   wherein the object information and the information code in said parts warehouse database are associated with each other in substantially the same manner as the information code and the reproduced object information in said reproduced parts warehouse database are associated with each other.

2. An information converting system according to claim 1, wherein said object information comprises image information.

3. An information converting system according to claim 1, wherein said information code comprises a combination of object data representing numerical values of the object and attributes thereof.

4. An information converting system according to claim 1, wherein said parts configuration processing means comprises means for converting the information code into reproduced part image information corresponding to an image of the object information based on said reproduced parts warehouse database, and, while being linked with the conversion of the information code into reproduced part image information, configuring a reproduced part image according to a configuration code representing coordinates and directions of the object and transmitted or outputted from said information code converting apparatus.

5. An information converting system comprising:
   an information code converting apparatus for convening object information acquired with respect to an object into a registered information code in association with the object, and transmitting or outputting the information code; and
   a reproduced information converting apparatus for converting the information code transmitted or inputted from said information code converting apparatus into registered reproduced object information in association with the information code;
   wherein said information code converting apparatus includes:
      field analysis correlation function calculating means for analyzing positions of objects in acquired images based on a field information database;
      optimum coordinate generating means for analyzing calculated results of said field analysis correlation function calculating means based on a coordinate code database thereby to generate optimum coordinates in the images;
      preprocessing means for defining contours of objects in the images from an analysis in the acquired images; and
      parts retrieval correlation function calculating means for converting contour data produced by said preprocessing means, field data produced by said field analysis correlation function calculating means, and optimum coordinate data produced by said optimum coordinate generating means into configuration codes, and comparing the object data in a parts warehouse database with the acquired object information, and selecting corresponding object data thereby to generate information codes to be combined with the configuration codes.

* * * * *